United States Patent
Xu et al.

(10) Patent No.: US 11,738,310 B2
(45) Date of Patent: Aug. 29, 2023

(54) METHOD FOR CLEANING MEMBRANE

(71) Applicant: INDUSTRIAL TECHNOLOGY RESEARCH INSTITUTE, Hsinchu (TW)

(72) Inventors: Hao Xiang Xu, Ershui Township (TW); Po-I Liu, Kaohsiung (TW); Min-Chao Chang, Hsinchu (TW); Hsin Shao, Zhubei (TW); Ren-Yang Horng, Hsinchu (TW); Teh-Ming Liang, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 711 days.

(21) Appl. No.: 16/731,631

(22) Filed: Dec. 31, 2019

(65) Prior Publication Data

US 2021/0197127 A1 Jul. 1, 2021

(51) Int. Cl.
*C11D 1/60* (2006.01)
*C11D 1/62* (2006.01)
*C11D 1/04* (2006.01)
*B01D 65/02* (2006.01)
*C11D 1/12* (2006.01)

(52) U.S. Cl.
CPC ............ B01D 65/02 (2013.01); C11D 1/04 (2013.01); C11D 1/12 (2013.01); C11D 1/60 (2013.01); C11D 1/62 (2013.01); *B01D 2321/168* (2013.01); *B01D 2321/28* (2013.01)

(58) Field of Classification Search
CPC . B01D 65/02; B01D 1/60; B01D 1/62; B01D 1/04
See application file for complete search history.

(56) References Cited

U.S. PATENT DOCUMENTS

| | | | | |
|---|---|---|---|---|
| 4,895,658 A | * | 1/1990 | Amjad | ...... C02F 5/08 210/636 |
| 6,204,234 B1 | * | 3/2001 | Herbots | ...... C11D 3/3907 510/393 |
| 6,387,189 B1 | * | 5/2002 | Groschl | ...... B01D 65/02 134/28 |
| 7,662,289 B2 | | 2/2010 | Musale et al. | |

(Continued)

FOREIGN PATENT DOCUMENTS

CN 101863855 A 10/2010
CN 102133504 A 7/2011
(Continued)

OTHER PUBLICATIONS

Moore et al. Journal of Membrane Science. 254 (2005) 63-71. (Year: 2005).*
(Continued)

*Primary Examiner* — Nicole M. Buie-Hatcher
*Assistant Examiner* — M. Reza Asdjodi
(74) *Attorney, Agent, or Firm* — Birch, Stewart, Kolasch & Birch, LLP

(57) ABSTRACT

A method for cleaning membrane is provided. The method includes, providing a membrane, introducing a thermo-sensitive ionic liquid to contact the membrane and perform a cleaning procedure to collect a cleaning solution, and layering the cleaning solution to form an aqueous layer and an ionic liquid layer at a specific temperature.

18 Claims, 6 Drawing Sheets

(56) References Cited

U.S. PATENT DOCUMENTS

| | | | |
|---|---|---|---|
| 7,674,382 B2 | 3/2010 | Musale | |
| 8,956,464 B2* | 2/2015 | Zauner | B01D 65/02 134/28 |
| 9,675,938 B2 | 6/2017 | Zha et al. | |
| 10,258,931 B2 | 4/2019 | Hong et al. | |
| 2008/0169006 A1* | 7/2008 | Musale | B01D 65/02 134/22.19 |
| 2008/0271758 A1* | 11/2008 | Musale | B01D 65/02 134/22.19 |
| 2009/0301382 A1* | 12/2009 | Patel | G01K 3/04 116/201 |
| 2011/0155638 A1* | 6/2011 | Bhattacharyya | C10G 21/20 208/187 |
| 2013/0153470 A1* | 6/2013 | Mezza | C10G 21/18 208/290 |
| 2013/0158279 A1* | 6/2013 | Mezza | C11B 3/00 554/176 |
| 2018/0056241 A1* | 3/2018 | Liu | C02F 1/445 |
| 2018/0230387 A1* | 8/2018 | Moore | C10G 45/04 |
| 2018/0257038 A1 | 9/2018 | Ishii et al. | |
| 2019/0085163 A1* | 3/2019 | Fagan | C08L 67/02 |
| 2021/0197127 A1* | 7/2021 | Xu | C11D 11/0041 |

FOREIGN PATENT DOCUMENTS

| | | | | |
|---|---|---|---|---|
| CN | 102861515 A | | 1/2013 | |
| CN | 104292364 B | | 8/2016 | |
| CN | 107774136 A | | 3/2018 | |
| CN | 108187408 A | | 6/2018 | |
| CN | 104981475 B | * | 10/2018 | A01N 59/16 |
| CN | 109289539 A | | 2/2019 | |
| CN | 109908761 A | | 6/2019 | |
| CN | 110548406 A | | 12/2019 | |
| EP | 0 295 595 A1 | | 12/1988 | |
| JP | 2006/55784 A | | 3/2006 | |
| JP | 2018-34149 A | | 3/2018 | |
| TW | I341217 B | | 5/2011 | |
| TW | I474875 B | | 3/2015 | |

OTHER PUBLICATIONS

Aguiar, A., et al., "Acid mine drainage treatment by nanofiltration: A study of membrane fouling, chemical cleaning, and membrane ageing", Separation and Purification Technology, 2018, vol. 192, pp. 185-195.

Ang, W., et al., "Chemical and physical aspects of cleaning of organic-fouled reverse osmosis membranes", Journal of Membranes Science, 2006, vol. 272, pp. 198-210.

Choudhury, R., et al., "Antifouling, fouling release and antimicrobial materials for surface modification of reverse osmosis and nanofiltration membranes", Jounal of Materials Chemistry A, 2018, vol. 6, pp. 313-333.

Ding, X., et al., "Design of functional guanidinium ionic liquid aqueous two-phase systems for the efficient purification of protein", Analytica Chemica Acta, 2014, vol. 815, pp. 22-32.

Espinasse, B., et al., "Comparison of chemical cleaning reagents and characterization of foulants of nanofiltration membranes used in surface water treartment", Desalination, 2012, vol. 296, pp. 1-6.

Kohno, Y., et al., "Ionic liquid/water mixtures: from hostility to conciliation", Chem, Commun., 2012, vol. 48, pp. 7119-7130.

Kohno, Y., et al., "Temperature-responsive ionic liquid/water interfaces: relation between hydrophilicity of ions and dynamic phase change", Phys. Chem. Chem. Phys., 2012. vol. 14, pp. 5063-5070.

Li, Q., et al., "Organic Fouling and Chemical Cleaning of Nanofiltration Membranes: Measurements and Mechanisms", Environ. Sci. Tehchnol., 2004, vol. 38, pp. 4683-4693.

Zhao, D., et al.,"Efficiencies and mechanisms of chemical cleaning agents for nanofiltration membranes used in produced wastewater desalination", Science of the Total Environment, 2019, vol. 652, pp. 256-266.

Taiwanese Office Action and Search Report, dated Jan. 8, 2021, for Taiwanese Application No. 108148578.

Japanese Office Action for Japanese Application No. 2020-178615, dated Dec. 1, 2021, with English translation.

Ohno et al., "Progress and Developments of Researches on Interface Concerning Ionic Liquids", Surface Chemistry, vol. 34, No. 4, 2013, pp. 166-172 (8 pages total), with an English abstract.

Yuling et al., "Effect of Anionic Structure on the LCST Phase Behavior of Phosphonium Ionic Liquids in Water", Industrial & Engineering Chemistry, vol. 57, 2018, pp. 12935-12941 (8 pages total).

Chinese Office Action and Search Report for Chinese Application No. 202010157639.6, dated Aug. 1, 2022.

* cited by examiner

METHOD FOR CLEANING MEMBRANE

TECHNICAL FIELD

The present disclosure relates to a method for cleaning a membrane by introducing a thermo-sensitive ionic liquid.

BACKGROUND

Membrane separation technology is often used in water treatment procedures. Long-term operation will reduce the effectiveness of water treatment of the surface of a membrane, due to the deposition of contaminants in the water. The prior art has prolonged the operation time of membranes by hydrophilic modification on the surface of the membrane, but it still cannot completely overcome the problem of membrane fouling. Therefore, the introduction of membrane cleaning agents is the best means to restore the initial performance of the membrane.

However, at present, commonly used membrane cleaning agents are disposable agents such as acids, alkalis, surfactants or chelating agents, which are discharged directly after the cleaning procedure, causing harm to the environment. On the other hand, the use of these agents is often accompanied by an extremely high or low pH environment. Although they are effective in removing the foulants on the membrane, they must be operated under a long-term extreme pH environment, and repeated cleaning processes can easily cause damage to the membrane and lower the efficiency of the membrane.

Therefore, the industry needs a novel method for cleaning membranes to solve the problems encountered by conventional technologies.

SUMMARY

In order to remove membrane foulants, the present disclosure provides a novel method for cleaning membranes. By introducing a thermo-sensitive ionic liquid and matching temperature control, the purpose of cleaning membranes and effectively recovering cleaning agents is achieved.

In accordance with one embodiment of the present disclosure, a method for cleaning a membrane is provided, including: providing a membrane; introducing a thermo-sensitive ionic liquid to contact the membrane to proceed to a cleaning procedure to collect a cleaning solution; and layering the cleaning solution to form an aqueous layer and an ionic liquid layer at a specific temperature.

In one embodiment, the membrane includes foulants. In one embodiment, the foulants include organics, inorganics or a combination thereof. In one embodiment, the membrane includes an ultrafiltration (UF) membrane, a nanofiltration (NF) membrane or a reverse osmosis (RO) membrane.

In one embodiment, the concentration of the thermo-sensitive ionic liquid is in a range from 1 wt % to 30 wt %, for example, between 5 wt % and 15 wt % or between 5 wt % and 20 wt %. If the concentration of the temperature-sensitive ionic liquid is too low, although the cleaning ability is still maintained, high energy consumption or more procedures is required to recover the ionic liquid (that is, too low concentration makes it difficult to recover the ionic liquid). If the concentration of the temperature-sensitive ionic liquid is too high, the cleaning effect cannot be emphasized due to an insufficient cross-flow velocity in the cleaning procedure. In one embodiment, the cation of the thermo-sensitive ionic liquid includes phosphonium salts or ammonium salts. In one embodiment, the cation of the thermo-sensitive ionic liquid includes

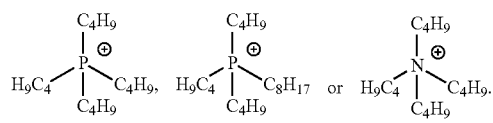

In one embodiment, the anion of the thermo-sensitive ionic liquid includes carboxylate salts or sulfonate salts. In one embodiment, the anion of the thermo-sensitive ionic liquid includes

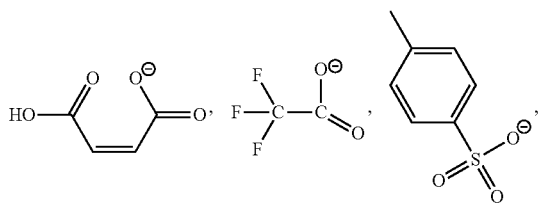

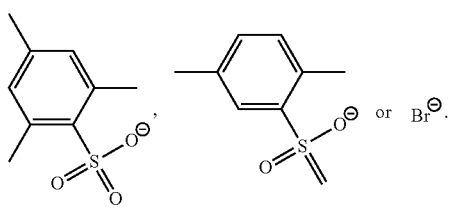

In one embodiment, the thermo-sensitive ionic liquid includes

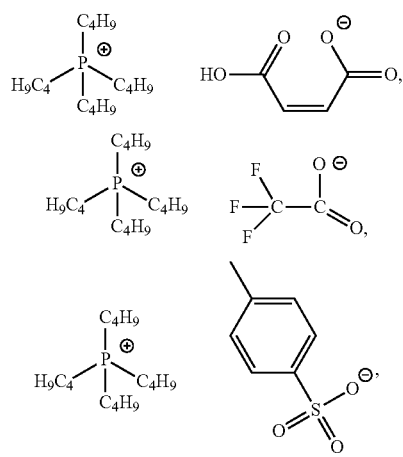

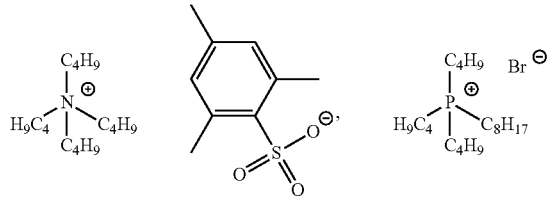

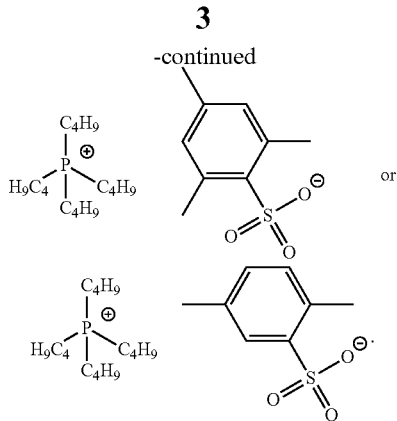

In one embodiment, the temperature of the cleaning procedure is in a range from 20° C. to 30° C. If the temperature of the cleaning procedure is too low, the rate of diffusion of the cleaning agent (the ionic liquid) to the foulants will be reduced, affecting the cleaning effect. If the temperature of the cleaning procedure is too high, it will easily cause membrane damage. In one embodiment, the cleaning procedure includes a soaking step and a washing step. In one embodiment, the period of the soaking step is in a range from 1 minute to 30 minutes. If the soaking step is too short, there is no sufficient time for the cleaning agent (the ionic liquid) to dissolve the foulants, reducing the cleaning effect. If the soaking step is too long, it may cause the cleaning agent (the ionic liquid) to penetrate into the membrane pores excessively, resulting in irreversible blockage of the membrane pores. In one embodiment, the period of the washing step is in a range from 1 minute to 30 minutes. In one embodiment, the cleaning solution includes the thermo-sensitive ionic liquid and the foulants. In one embodiment, the specific temperature for layering the cleaning solution to form the aqueous layer and the ionic liquid layer is in a range from 25° C. to 90° C. In one embodiment, the ionic liquid layer includes the thermo-sensitive ionic liquid, and the aqueous layer includes the foulants.

In one embodiment, the present method for cleaning a membrane further includes performing a first water rinse step before the step of introducing the thermo-sensitive ionic liquid. In one embodiment, the temperature of the first water rinse step is in a range from 20° C. to 30° C. In one embodiment, the period of the first water rinse step is in a range from 1 minute to 30 minutes. In one embodiment, the present method for cleaning a membrane further includes performing a second water rinse step after the cleaning procedure. In one embodiment, the temperature of the second water rinse step is in a range from 20° C. to 30° C. In one embodiment, the period of the second water rinse step is in a range from 1 minute to 30 minutes.

The present disclosure uses a thermo-sensitive ionic liquid as a membrane cleaning agent, which has the advantage that the hydrophilicity and hydrophobicity of the thermo-sensitive ionic liquid is altered by adjusting the structure (composite) or modifying anions and cations of the thermo-sensitive ionic liquid. In addition, the acid-base degree of the ionic liquid is regulated by selection of anions. The ionic liquid can exhibit different degrees of acidity and alkalinity without additional acid or alkali. Furthermore, due to its unique characteristics of shape, structure, solvent-like and surfactant, the ionic liquid has excellent extraction capabilities for foulants such as proteins or metal ions, that is, it has excellent cleaning ability on membranes. Because of the temperature-sensitive phase-separation characteristics, at a specific temperature, the cleaning solution will spontaneously separate into an aqueous layer and an ionic liquid layer, so that the ionic liquid can be easily recovered and reused.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION

In accordance with one embodiment of the present disclosure, a method for cleaning a membrane is provided, including, providing a membrane; introducing a thermo-sensitive ionic liquid to contact the membrane to proceed to a cleaning procedure to collect a cleaning solution; and layering the cleaning solution to form an aqueous layer and an ionic liquid layer at a specific temperature.

In one embodiment, the membrane includes foulants, for example, organics, inorganics or a combination thereof. In one embodiment, the membrane may include an ultrafiltration (UF) membrane, a nanofiltration (NF) membrane or a reverse osmosis (RO) membrane.

In one embodiment, the concentration of the thermo-sensitive ionic liquid is in a range from about 1 wt % to about 30 wt %. In one embodiment, the cation of the thermo-sensitive ionic liquid may include phosphonium salts or ammonium salts. In one embodiment, the cation of the thermo-sensitive ionic liquid may include

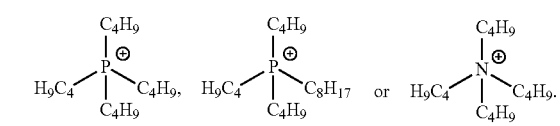

In one embodiment, the anion of the thermo-sensitive ionic liquid may include carboxylate salts or sulfonate salts. In one embodiment, the anion of the thermo-sensitive ionic liquid may include

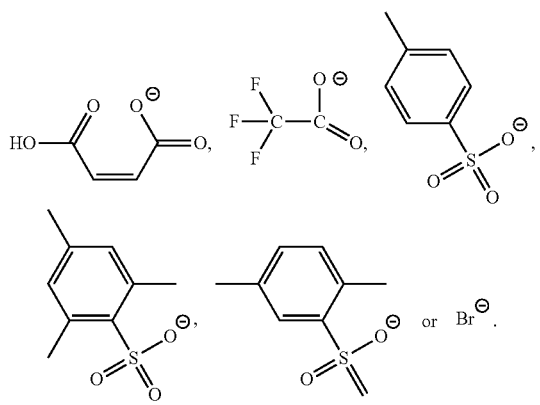

In one embodiment, the thermo-sensitive ionic liquid may include

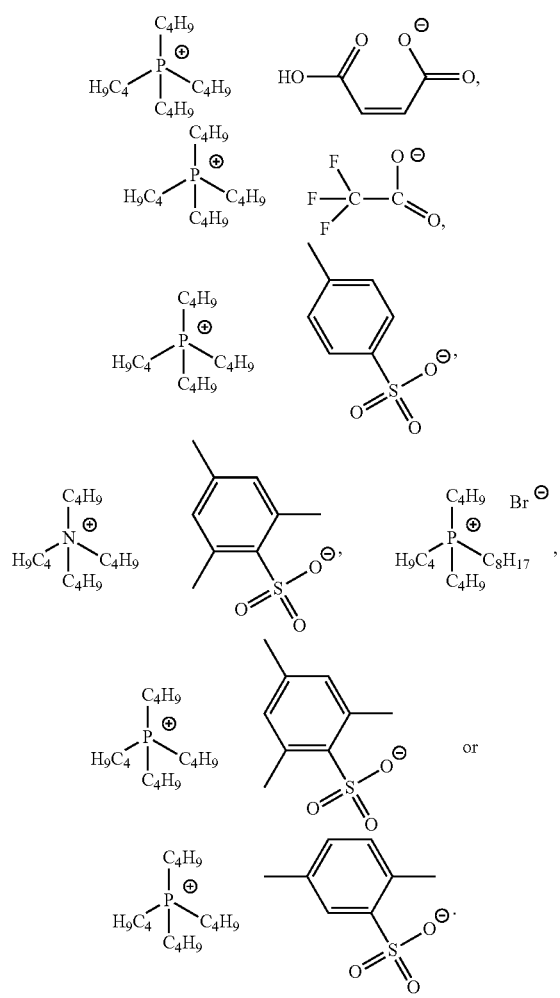

In one embodiment, the temperature of the cleaning procedure is in a range from about 20° C. to about 30° C. In one embodiment, the cleaning procedure may include a soaking step and a washing step. In one embodiment, the period of the soaking step is in a range from about 1 minute to about 30 minutes. In one embodiment, the period of the washing step is in a range from about 1 minute to about 30 minutes. In one embodiment, the cleaning solution may include the thermo-sensitive ionic liquid and the foulants. In one embodiment, the specific temperature for layering the cleaning solution to form the aqueous layer and the ionic liquid layer is in a range from about 25° C. to about 90° C. In one embodiment, the ionic liquid layer may include the thermo-sensitive ionic liquid, and the aqueous layer may include the foulants.

The present disclosure utilizes structural tunability, extraction ability and temperature-sensitive phase-transition characteristics of thermo-sensitive ionic liquids to allow the membrane to be cleaned in a milder environment. After the cleaning process, the thermo-sensitive ionic liquids were recovered by the phase-separation characteristics, reducing the risk of membrane damage and environmental hazards caused by traditional cleaning agents.

Example 1

Phase-Transition Characteristics of Thermo-Sensitive Ionic Liquids

First, anions

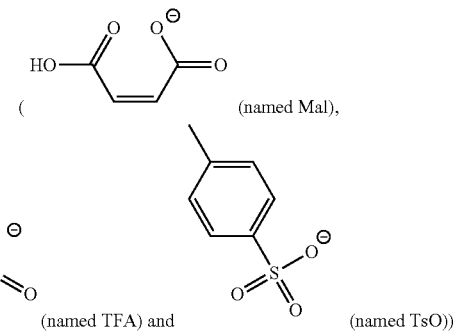

were respectively mixed with a cation

Figure 1:
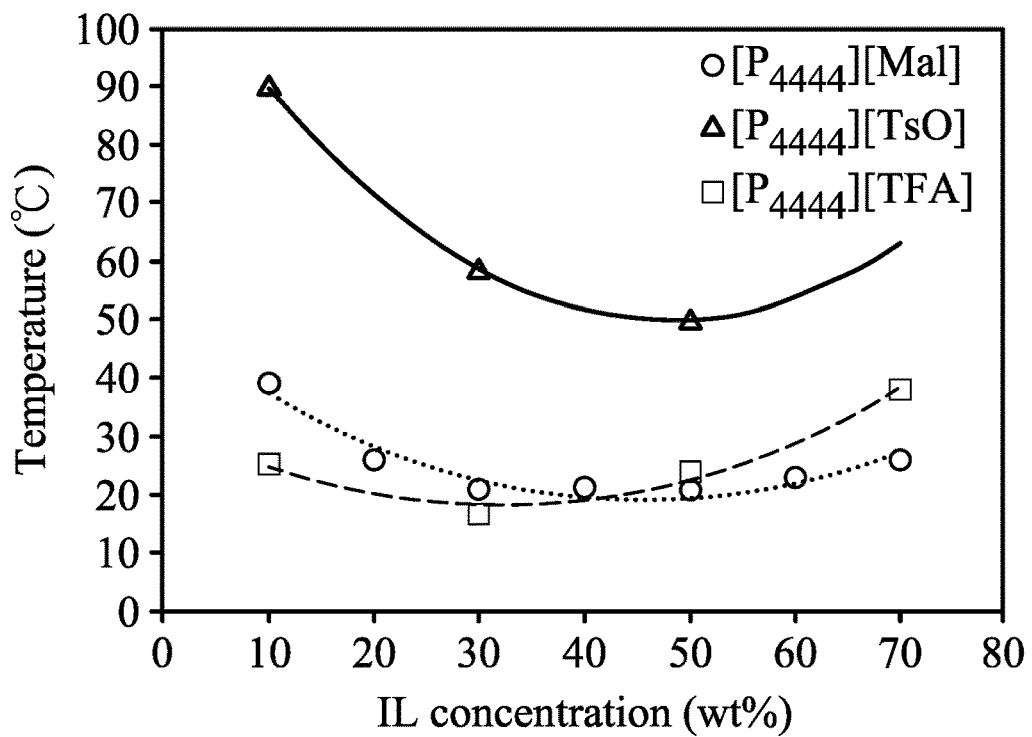
FIG. 1 shows curves of phase-transition temperature of thermo-sensitive ionic liquids in accordance with one embodiment of the present disclosure.

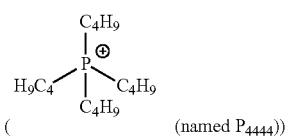

in a molar ratio of 1:1 and stirred at room temperature for 24 hours. Next, each of the above mixtures was placed in an oven at 70° C. to remove water from the solution, and ionic liquids (named $[P_{4444}][Mal]$, $[P_{4444}][TFA]$ and $[P_{4444}][TsO]$) composed of the above anions and cations were obtained. The ionic liquids of various weights were respectively mixed with water to observe the phase-transition temperature of the ionic liquids with various concentrations, as shown in FIG. 1. The curves of the phase-transition temperature in FIG. 1 show that all of the disclosed ionic liquid aqueous solution had the phase-transition characteristics of lower critical solution temperature (LCST).

Example 2

Viscosity Characteristics of Thermo-Sensitive Ionic Liquids

First, anions

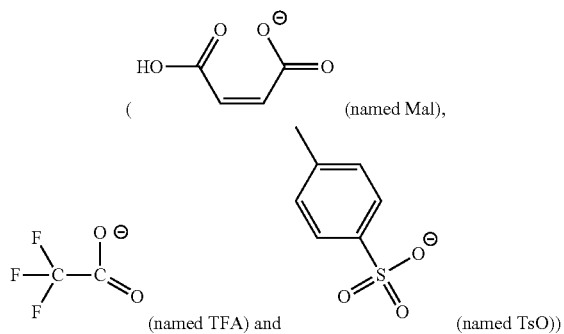

were respectively mixed with a cation

Figure 2:
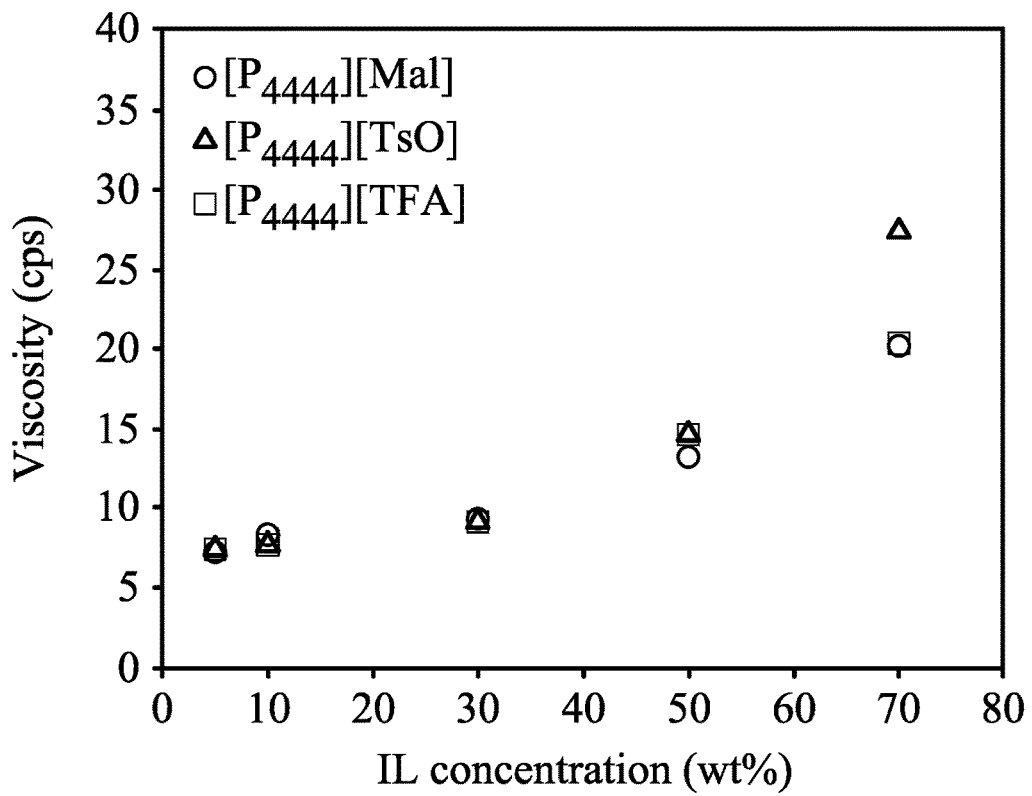
FIG. 2 shows a relationship between concentration and viscosity of various thermo-sensitive ionic liquids in accordance with one embodiment of the present disclosure.

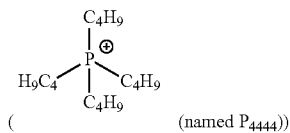

in a molar ratio of 1:1 and stirred at room temperature for 24 hours. Next, each of the above mixtures was placed in an oven at 70° C. to remove water from the solution, and ionic liquids (named [P$_{4444}$][Mal], [P$_{4444}$][TFA] and [P$_{4444}$][TsO]) composed of the above anions and cations were obtained. The ionic liquids of various weights were respectively mixed with water to observe the variation of viscosity of the ionic liquids with various concentrations, as shown in FIG. 2. The results of viscosity measured in FIG. 2 show that when the concentration of the ionic liquid was higher than 50 wt %, its viscosity was already greater than 10 cps. Excessive viscosity will cause a pump to consume more power to maintain a high cross-flow velocity, or the energy-consumption cost will increase due to a significant decrease in flow rate, or it will not be able to effectively remove foulants from the membrane. Therefore, for nanofiltration (NF) membranes, the concentration of the ionic liquid during cleaning was less than about 30 wt %.

Example 3

Evaluation of Cleaning Effects of Various Membrane Cleaning Agents on a Membrane (Using a Flat Membrane)

First, a fully wetted flat membrane (50 cm$^2$) was put into a system, and an initial performance test of the new membrane was performed with 2,000 ppm of MgSO$_4$ as a feed. The initial flux J$_0$ was measured. Next, the feed was altered to 2,000 ppm of MgSO$_4$ and 1,000 ppm of bovine serum albumin (BSA) foulants, and a fouling experiment was performed. A flux J$_F$ after fouling was measured over time. After a flux decline ratio (FDR) reached 20%, a cleaning procedure was started. Next, the fouled flat membrane was washed with RO water for 10 minutes. After washing, a post-fouled performance test was performed with 2,000 ppm of MgSO$_4$. A flux J$_{C1}$ after washing with RO water was measured, and confirmed that the foulants on the membrane cannot be removed by water. Next, the prepared membrane cleaning agents (HCl (pH=1), NaOH (pH=12), 0.2 wt % EDTA-Na$_4$/NaOH (pH=12), 0.4 wt % EDTA-Na$_4$/NaOH (pH=12), 0.6 wt % EDTA-Na$_4$/NaOH (pH=12), 0.025 wt % SDS-Na/NaOH (pH=12), 0.03 wt % SDS-Na/NaOH (pH=12), 20 wt % [P$_{4444}$][Mal], 20 wt % [P$_{4444}$][TFA] and 20 wt % [P$_{4444}$][TsO]) were introduced into the system respectively, and the foulants were removed by performing a cleaning procedure of soaking and stirring for 30 minutes (at the cleaning temperature of 25° C.). After cleaning, the cleaning agent was discharged, and then RO water was introduced to remove the cleaning agent solution remaining in the system. After cleaning, a membrane efficacy test was performed with 2,000 ppm MgSO$_4$, and a flux J$_{C2}$ after cleaning with the cleaning agent was measured. The flux recovery rate (FDR) of the flat membrane was calculated under the effects of various cleaning agents, and the results are shown in FIG. 3.

J$_0$: initial flux; J$_F$: flux after fouling; J$_{C1}$: flux after washing with RO water; J$_{C2}$: flux after cleaning with a cleaning agent; FDR: Flux Decline Ratio; Flux Decline Ratio (%): $(1-(J_F/J_0))\times 100\%$; and Flux Recovery Rate (%): $J_{C2}/J_0\times 100\%$.

Figure 3:
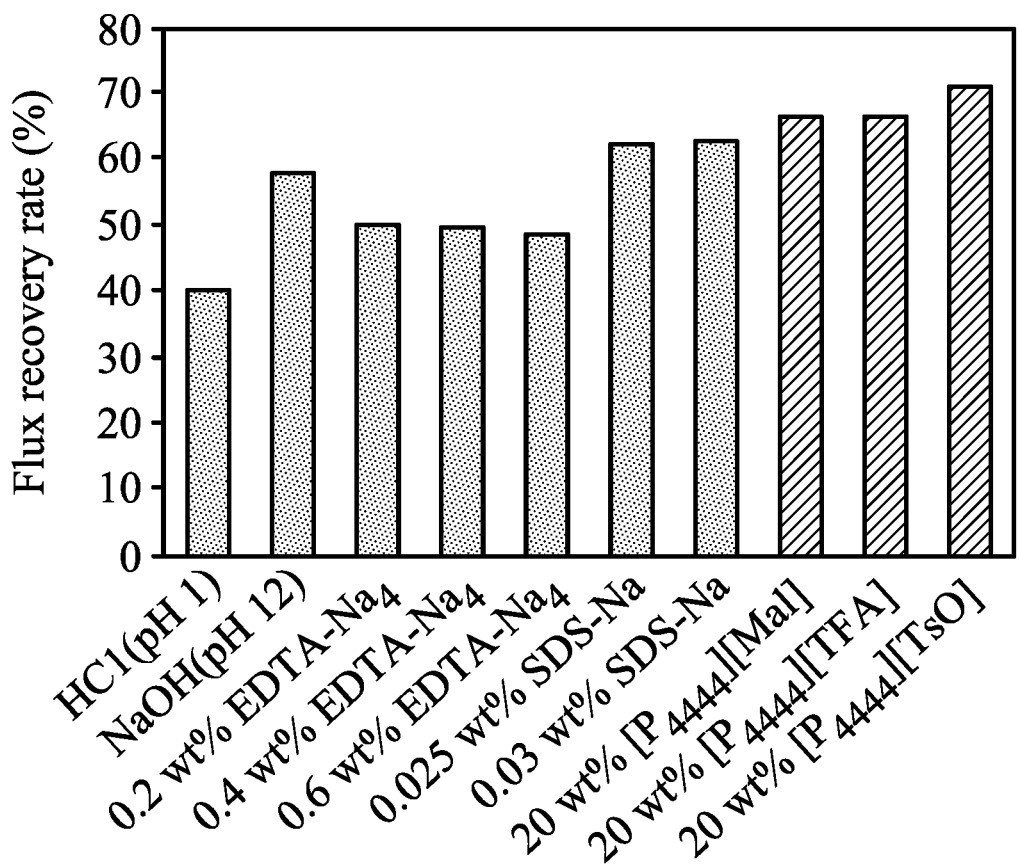
FIG. 3 shows cleaning effects of various membrane cleaning agents on a membrane (using a flat membrane) in accordance with one embodiment of the present disclosure.

The results in FIG. 3 show that, for the BSA-fouled membrane, the traditional cleaning agents were often accompanied by an acid-base concentration of pH=1 or 12, which easily damaged the membrane. The disclosed ionic liquids can reach pH=5-8 through the control of anions and cations, reducing the chance of membrane damage. From the experimental results of the ionic liquids ([P$_{4444}$][Mal], [P$_{4444}$][TFA], and [P$_{4444}$][TsO]), it was found that the cleaning effects of the ionic liquids were greater than 66%, which were better than the traditional cleaning agents such as acids, alkalis, chelating agents (EDTA) (the higher the concentration of EDTA, the lower the pH value), and surfactants (SDS), etc.

Example 4

Evaluation of Cleaning Effects of Ionic-Liquid Membrane Cleaning Agents with Various Concentrations on a Membrane (Using a Flat Membrane)

First, a fully wetted flat membrane (50 cm$^2$) was put into a system, and an initial performance test of the new membrane was performed with 2,000 ppm of MgSO$_4$ as a feed. The initial flux J$_0$ was measured. Next, the feed was altered to 2,000 ppm of MgSO$_4$ and 1,000 ppm of bovine serum albumin (BSA) foulants, and a fouling experiment was performed. A flux J$_F$ after fouling was measured over time. After a flux decline ratio (FDR) reached 20%, a cleaning procedure was started. Next, the fouled flat membrane was washed with RO water for 10 minutes. After washing, a post-fouled performance test was performed with 2,000 ppm of MgSO$_4$. A flux J$_{C1}$ after washing with RO water was measured, and confirmed that the foulants on the membrane cannot be removed by water. Next, the prepared ionic-liquid membrane cleaning agents with various concentrations (20 wt % [P$_{4444}$][Mal], 10 wt % [P$_{4444}$][Mal] and 5 wt % [P$_{4444}$][Mal]) were introduced into the system respectively, and the foulants were removed by performing a cleaning procedure of soaking for 25 minutes and washing for 5 minutes (at the cleaning temperature of 25° C.). After cleaning, the ionic-liquid cleaning agent was discharged and collected, and then RO water was introduced to remove the ionic-liquid solution remaining in the system. After cleaning, a membrane efficacy test was performed with 2,000 ppm MgSO$_4$, and a flux J$_{C2}$ after cleaning with the ionic liquid was measured. The formula ($J_{C2}/J_0 \times 100\%$) of the flux recovery rate disclosed in Example 3 was used to calculate the flux recovery rate of the flat membrane under the effects of the ionic-liquid cleaning agents with various concentrations, and the results are shown in FIG. 4.

Figure 4:
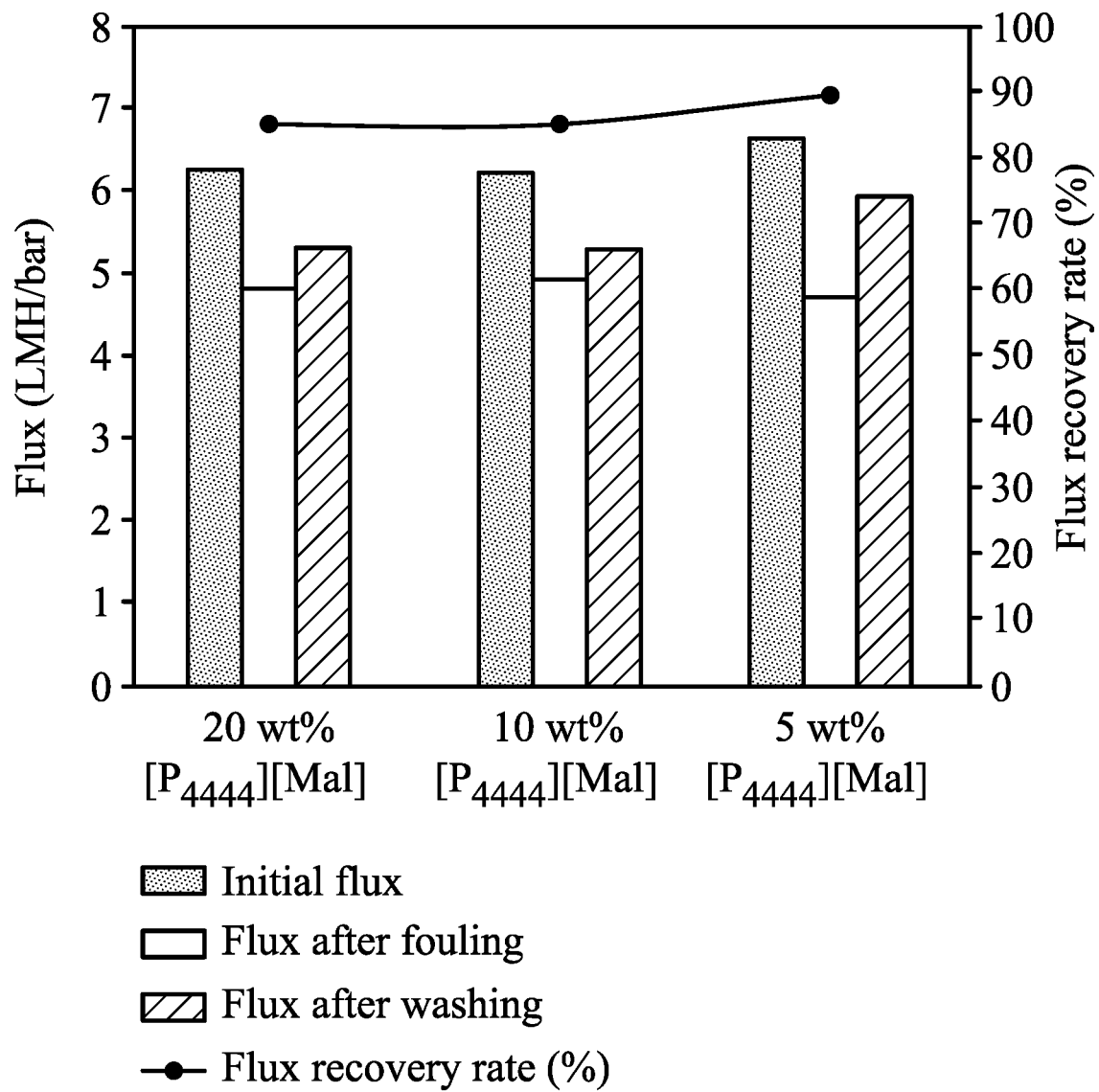
FIG. 4 shows cleaning effects of membrane cleaning agents with various concentrations on a membrane (using a flat membrane) in accordance with one embodiment of the present disclosure.

The results in FIG. 4 show that the three ionic-liquid cleaning agents with various concentrations of the present disclosure have the cleaning effects on the membrane, and the flux recovery rate will increase as the concentration of the ionic liquids decreases. Among them, the cleaning effect of 5 wt % [$P_{4444}$][Mal], the flux recovery rate of the membrane can reach 90%.

Example 5

Evaluation of Cleaning Effects of Various Cleaning Procedures on a Membrane (Using a Flat Membrane)

First, a fully wetted flat membrane (50 cm$^2$) was put into a system, and an initial performance test of the new membrane was performed with 2,000 ppm of MgSO$_4$ as a feed. The initial flux $J_0$ was measured. Next, the feed was altered to 2,000 ppm of MgSO$_4$ and 1,000 ppm of bovine serum albumin (BSA) foulants, and a fouling experiment was performed. A flux $J_F$ after fouling was measured over time. After a flux decline ratio (FDR) reached 20%, a cleaning procedure was started. Next, the fouled flat membrane was washed with RO water for 10 minutes. After washing, a post-fouled performance test was performed with 2,000 ppm of MgSO$_4$. A flux $J_{C1}$ after washing with RO water was measured, and confirmed that the foulants on the membrane cannot be removed by water. Next, the prepared ionic-liquid membrane cleaning agent with the specific concentration (5 wt % [$P_{4444}$][Mal]) was introduced into the system. At the cleaning temperature of 25° C., the foulants were removed by performing the following cleaning procedures: (1) washing for 1 minute, (2) soaking for 1 minute and washing for 1 minute, (3) soaking for 5 minute and washing for 5 minute, and (4) soaking for 25 minute and washing for 5 minute. After cleaning, the ionic-liquid cleaning agent was discharged and collected, and then RO water was introduced to remove the ionic-liquid solution remaining in the system. After cleaning, a membrane efficacy test was performed with 2,000 ppm MgSO$_4$, and a flux $J_{C2}$ after cleaning with the ionic liquid was measured. The formula ($J_{C2}/J_0 \times 100\%$) of the flux recovery rate disclosed in Example 3 was used to calculate the flux recovery rate of the flat membrane under various cleaning procedures, and the results are shown in FIG. 5.

Figure 5:
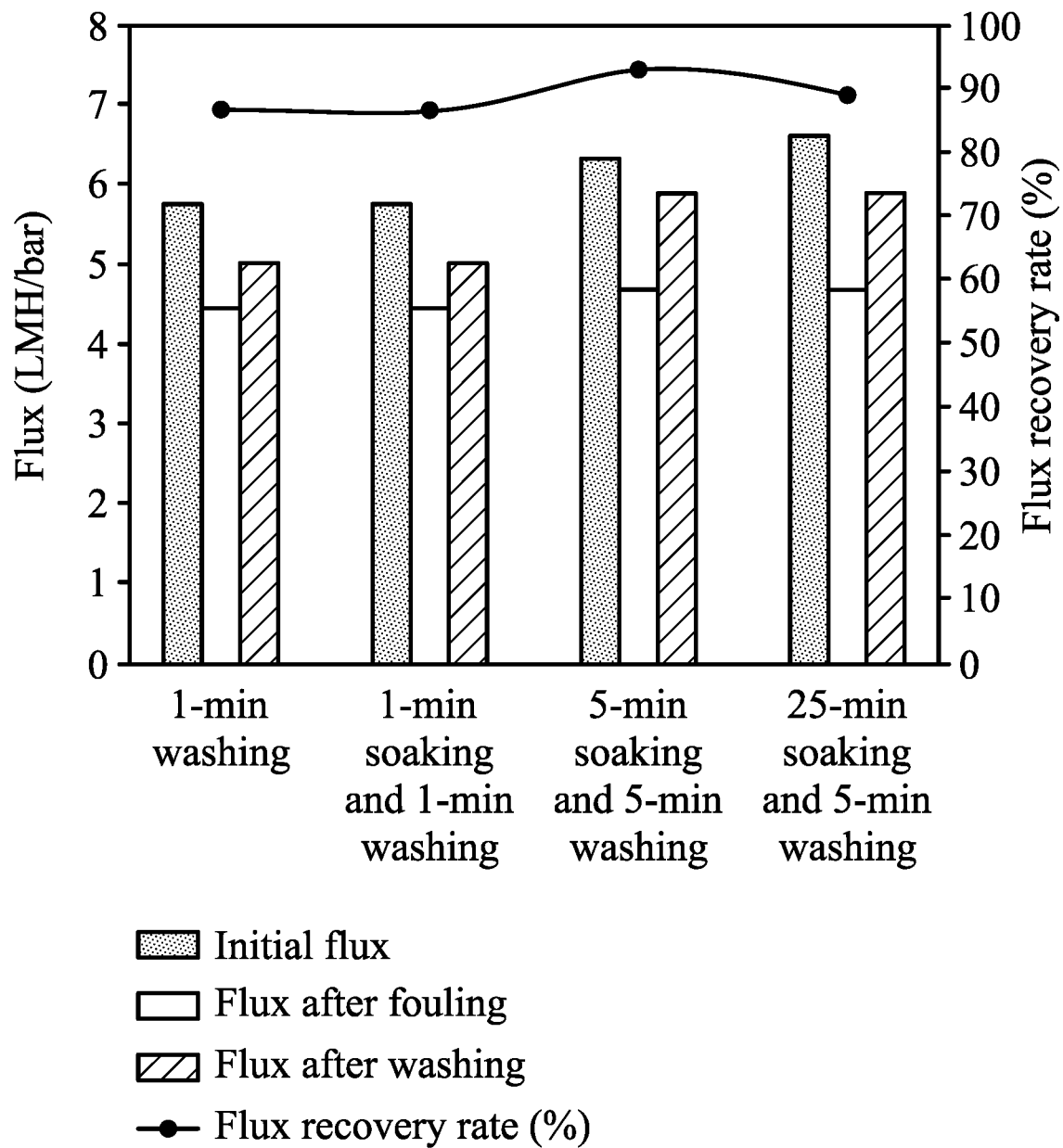
FIG. 5 shows cleaning effects of various cleaning procedures on a membrane (using a flat membrane) in accordance with one embodiment of the present disclosure.

The results of FIG. 5 show that when the ionic-liquid cleaning agent of the present disclosure was further matched with appropriate cleaning conditions (for example, soaking for 5 minutes and washing for 5 minutes), the flux recovery rate of the flat membrane can reach 93%.

Example 6

Evaluation of Cleaning Effects of Various Membrane Cleaning Agents on a Membrane (1812 Spiral-Wound Membrane)

First, a fully wetted membrane (0.4 m$^2$) was put into a system, and an initial performance test of the fresh membrane was performed with 2,000 ppm of MgSO$_4$ as a feed. The initial flux $J_0$ was measured. Next, the feed was altered to 2,000 ppm of MgSO$_4$ and 1,000 ppm of bovine serum albumin (BSA) foulants, and a fouling experiment was performed. A flux $J_F$ after fouling was measured over time. After a flux decline ratio (FDR) reached 20%, a cleaning procedure was started. Next, the fouled membrane was washed with RO water for 10 minutes. After washing, a post-fouled performance test was performed with 2,000 ppm of MgSO$_4$. A flux $J_{C1}$ after washing with RO water was measured, and confirmed that the foulants on the membrane cannot be removed by water. Next, the prepared membrane cleaning agents (5 wt % [$P_{4444}$][Mal], 5 wt % [$P_{4444}$][TFA], 5 wt % [$P_{4444}$][TsO] and 0.03 wt % SDS-Na/NaOH (pH=12)) were introduced into the system respectively. In this example, the foulants were removed using various types of membrane cleaning agents matched with various cleaning conditions. After cleaning, the cleaning agent was discharged, and then RO water was introduced to remove the cleaning agent solution remaining in the system. After cleaning, a membrane efficacy test was performed with 2,000 ppm MgSO$_4$, and a flux $J_{C2}$ after cleaning with the cleaning agent was measured. The formula ($J_{C2}/J_0 \times 100\%$) of the flux recovery rate disclosed in Example 3 was used to calculate the flux recovery rate of the membrane under the effects of various cleaning agents, and the results are shown in FIG. 6.

Figure 6:
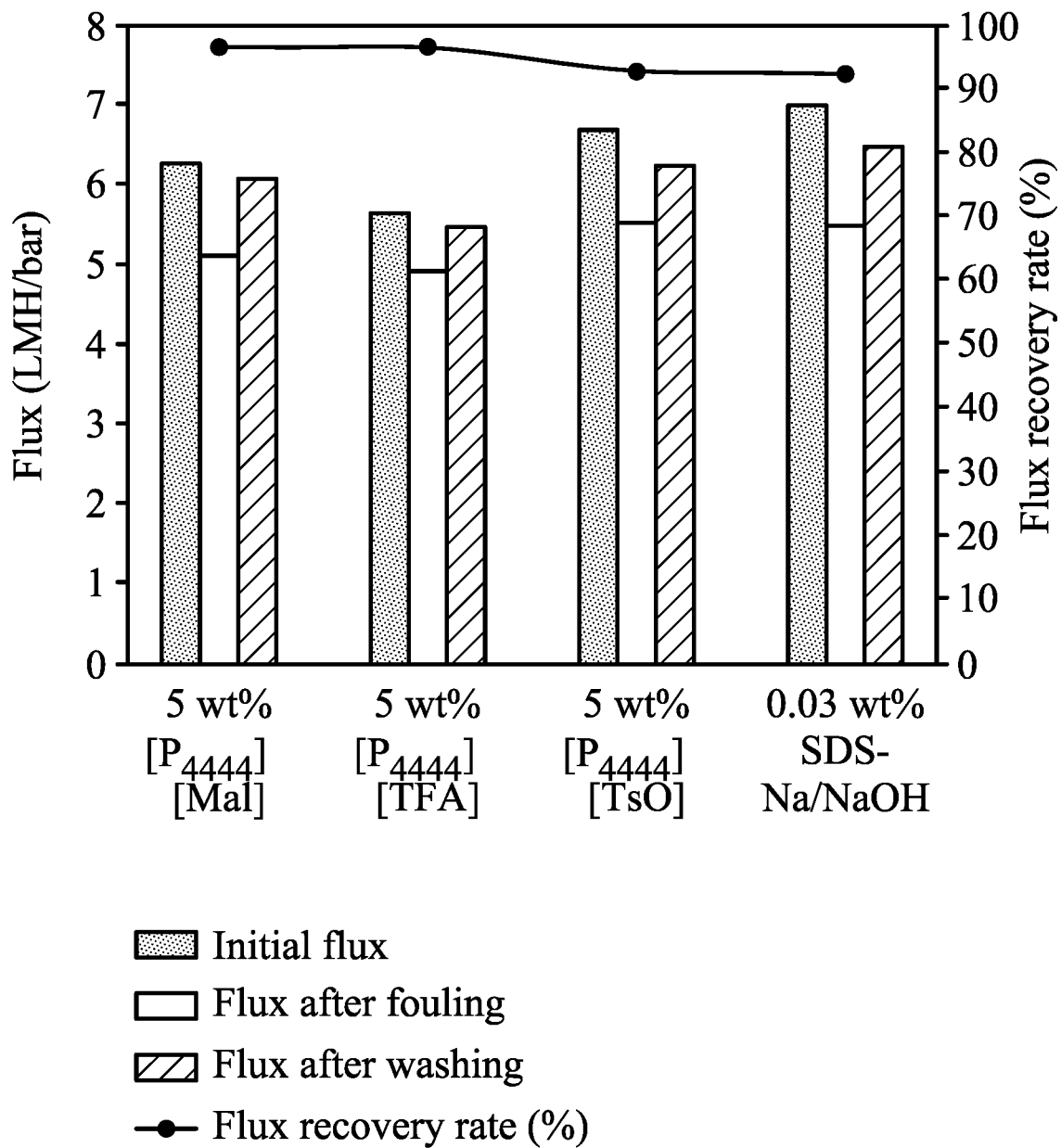
FIG. 6 shows cleaning effects of various cleaning agents on a membrane (1812 spiral-wound module) in accordance with one embodiment of the present disclosure.

The results in FIG. 6 show that, under the effect of the traditional cleaning agent SDS-Na/NaOH (at the cleaning temperature of 30° C.; soaking for 25 minutes and washing for 5 minutes), the flux recovery rate of the membrane was about 93%. Under the effect of 5 wt % [$P_{4444}$][TsO] (at the cleaning temperature of 25° C.; soaking for 5 minutes and washing for 5 minutes), the flux recovery rate of the membrane was about 93%. Under the effect of 5 wt % [$P_{4444}$][TFA] (at the cleaning temperature of 25° C.; soaking for 10 minutes and washing for 5 minutes), the flux recovery rate of the membrane was about 95%. Under the effect of 5 wt % [$P_{4444}$][Mal] (at the cleaning temperature of 25° C.; soaking for 5 minutes and washing for 5 minutes), the flux recovery rate can be as high as 98%.

Example 7

Evaluation of Recovery and Reuse Effects of Ionic-Liquid Membrane Cleaning Agent (Using a 1812 Spiral-Wound Membrane)

First, a fully wetted membrane (0.4 m$^2$) was put into a system, and an initial performance test of the fresh membrane was performed with 2,000 ppm of MgSO$_4$ as a feed. The initial flux $J_0$ was measured. Next, the feed was altered to 2,000 ppm of MgSO$_4$ and 1,000 ppm of bovine serum albumin (BSA) foulants, and a fouling experiment was performed. A flux $J_F$ after fouling was measured over time. After a flux decline ratio (FDR) reached 20%, a cleaning procedure was started. Next, the fouled membrane was washed with RO water for 10 minutes. After washing, a post-fouled performance test was performed with 2,000 ppm of MgSO$_4$. A flux $J_{C1}$ after washing with RO water was measured, and confirmed that the foulants on the membrane cannot be removed by water. Next, the prepared ionic-liquid membrane cleaning agent with the specific concentration (5 wt % [$P_{4444}$][Mal]) was introduced into the system. At the cleaning temperature of 25° C., the foulants were removed by performing a cleaning procedure of soaking for 5 minute and washing for 5 minute. After cleaning, the ionic-liquid cleaning agent was discharged and collected, and then RO water was introduced to remove the ionic-liquid solution remaining in the system. After cleaning, a membrane efficacy test was performed with 2,000 ppm MgSO$_4$, and a flux $J_{C2}$ after cleaning with the ionic liquid was measured. The formula ($J_{C2}/J_0 \times 100\%$) of the flux recovery rate disclosed in Example 3 was used to calculate the flux recovery rate of the membrane. Next, the bovine serum albumin (BSA) fouling experiment was performed using the same membrane repeatedly, and the recovered ionic liquid ([$P_{4444}$][Mal]) was used to perform a cleaning procedure on the membrane again. After cleaning, the flux recovery rate was also calculated, and the results are shown in FIG. 7.

Figure 7:
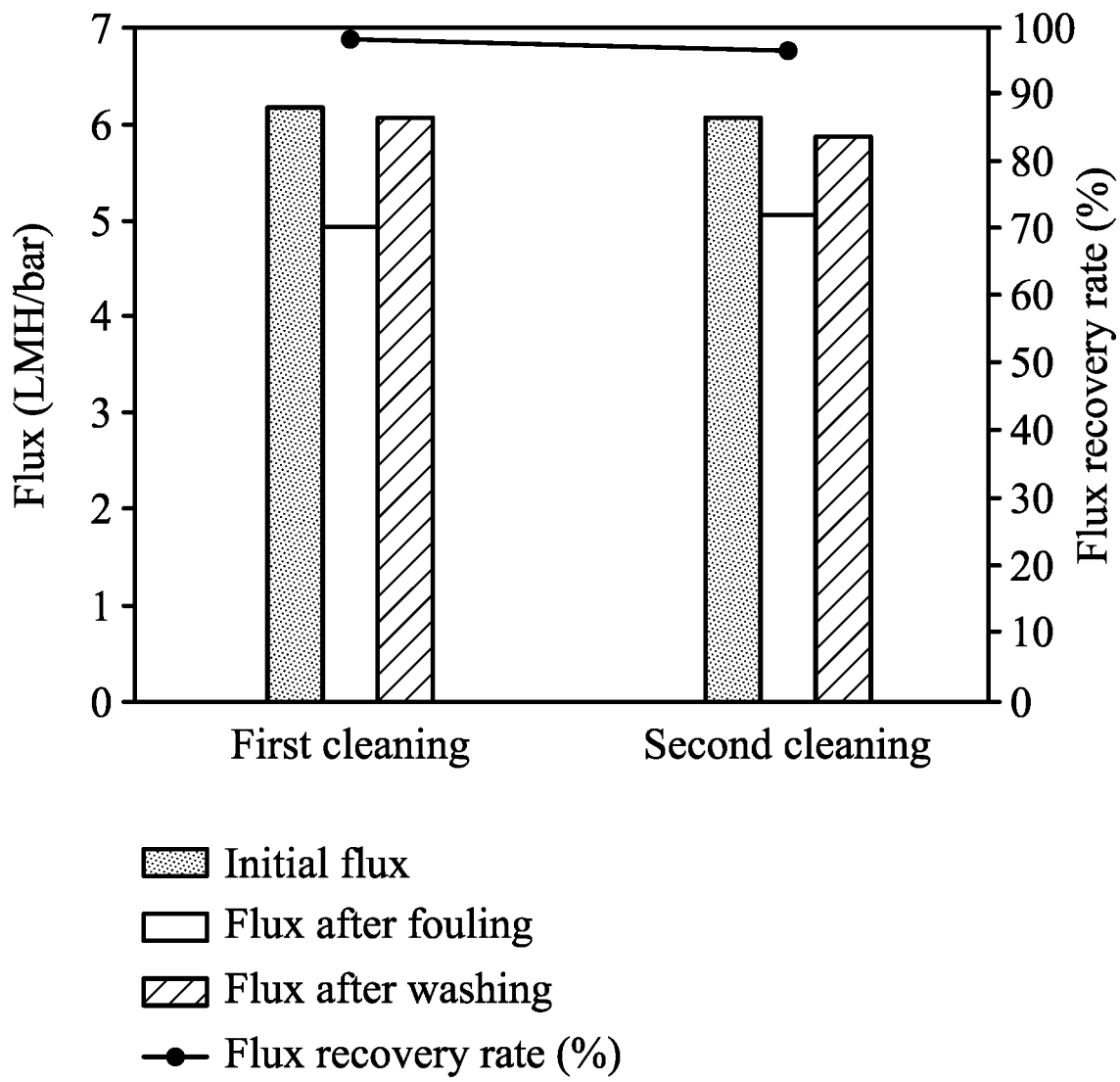
FIG. 7 shows recovery and reuse effects of membrane cleaning agents in accordance with one embodiment of the present disclosure.

The results in FIG. 7 show that, after cleaning again with the recovered ionic liquid, the flux recovery rate of the membrane can still reach 97%, indicating that the disclosed ionic liquid as a membrane cleaning agent had the effect of being recyclable and reusable.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for cleaning a membrane, comprising:
providing a membrane;
introducing a thermo-sensitive ionic liquid having a cation and an anion to contact the membrane to proceed to a cleaning procedure to collect a cleaning solution, wherein the thermo-sensitive ionic liquid comprises

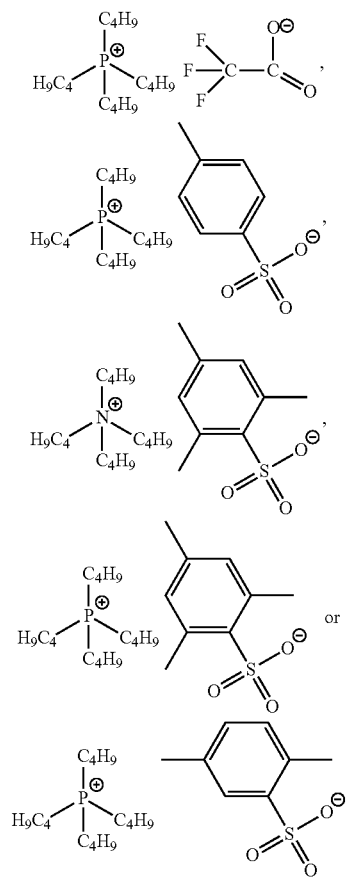

and layering the cleaning solution to form an aqueous layer and an ionic liquid layer at a specific temperature.

2. The method for cleaning a membrane as claimed in claim 1, wherein the membrane comprises foulants.

3. The method for cleaning a membrane as claimed in claim 2, wherein the foulants comprise organics, inorganics or a combination thereof.

4. The method for cleaning a membrane as claimed in claim 2, wherein the cleaning solution comprises the thermo-sensitive ionic liquid and the foulants.

5. The method for cleaning a membrane as claimed in claim 1, wherein the membrane comprises an ultrafiltration (UF) membrane, a nanofiltration (NF) membrane or a reverse osmosis (RO) membrane.

6. The method for cleaning a membrane as claimed in claim 1, wherein the thermo-sensitive ionic liquid has a concentration from 1 wt % to 30 wt %.

7. The method for cleaning a membrane as claimed in claim 1, wherein the cleaning procedure has a temperature from 20° C. to 30° C.

8. The method for cleaning a membrane as claimed in claim 1, wherein the cleaning procedure comprises a soaking step and a washing step.

9. The method for cleaning a membrane as claimed in claim 8, wherein the soaking step has a period from 1 minute to 30 minutes.

10. The method for cleaning a membrane as claimed in claim 8, wherein the washing step has a period from 1 minute to 30 minutes.

11. The method for cleaning a membrane as claimed in claim 1, wherein the specific temperature is in a range from 25° C. to 90° C.

12. The method for cleaning a membrane as claimed in claim 11, wherein the ionic liquid layer comprises the thermo-sensitive ionic liquid, and the aqueous layer comprises the foulants.

13. The method for cleaning a membrane as claimed in claim 1, further comprising performing a first water rinse step before the step of introducing the thermo-sensitive ionic liquid.

14. The method for cleaning a membrane as claimed in claim 13, wherein the first water rinse step has a temperature from 20° C. to 30° C.

15. The method for cleaning a membrane as claimed in claim 13, wherein the first water rinse step has a period from 1 minute to 30 minutes.

16. The method for cleaning a membrane as claimed in claim 1, further comprising performing a second water rinse step after the cleaning procedure.

17. The method for cleaning a membrane as claimed in claim 16, wherein the second water rinse step has a temperature from 20° C. to 30° C.

18. The method for cleaning a membrane as claimed in claim 16, wherein the second water rinse step has a period from 1 minute to 30 minutes.

* * * * *